United States Patent [19]

Tchernyak

[11] 4,126,329

[45] Nov. 21, 1978

[54] WHEELED VEHICLE WITH OAR-TYPE PROPULSION

[76] Inventor: Shimon S. Tchernyak, 9727-155 St., Edmonton, Alberta, Canada, T5P 2K8

[21] Appl. No.: 808,697

[22] Filed: Jun. 21, 1977

[51] Int. Cl.$^2$ ............................................. B62M 1/14
[52] U.S. Cl. ..................................... 280/220; 280/244
[58] Field of Search ............... 280/211, 220–226 R, 280/240, 241, 250, 242 R, 253, 1.11 A, 244; 272/72; 74/96, 98

[56] References Cited

U.S. PATENT DOCUMENTS

| | | | |
|---|---|---|---|
| 224,415 | 2/1880 | French | 280/220 X |
| 348,619 | 9/1886 | Courtney | 280/220 |
| 369,860 | 9/1887 | Kempster | 280/220 |
| 427,110 | 5/1890 | Quevedo | 280/220 X |
| 500,826 | 7/1893 | Thacher | 280/220 X |
| 511,839 | 1/1894 | Ford | 280/241 X |
| 642,544 | 1/1900 | Burbank | 280/220 |
| 1,252,430 | 1/1918 | Gruenberg | 280/211 |
| 2,480,013 | 8/1949 | Gassmann | 74/96 X |

Primary Examiner—Kenneth H. Betts
Attorney, Agent, or Firm—Clarence A. O'Brien; Harvey B. Jacobson

[57] ABSTRACT

A vehicle frame is provided and includes opposite side support wheels journalled from the frame. Each of the support wheels has a pair of first and second drive wheels journalled from the frame operatively associated therewith. Each pair of first and second drive wheels is drivingly interconnected by means of an endless drive member trained thereabout and one of the drive wheels of each pair is drivingly connected to the corresponding support wheel of the frame. A pair of elongated levers are provided and the levers are disposed on opposite sides of the frame and extend generally transversely thereof. The outer ends of the levers are anchored to the corresponding endless drive members for orbiting therewith about the corresponding pair of first and second drive wheels and the inner ends of the levers are provided with hand grips for engagement by the hands of a person seated along the longitudinal center line of the vehicle. In this manner, the levers may be utilized in the manner of oars in order to propel the vehicle.

10 Claims, 9 Drawing Figures

WHEELED VEHICLE WITH OAR-TYPE PROPULSION

BACKGROUND OF THE INVENTION

Various forms of vehicles have been heretofore provided for propulsion by the occupant or occupants of the vehicles by reciprocation or oscillatory movement of a drive actuator. However, there has been little development of vehicles including drive systems which may be operated in the manner of conventional oars.

Inasmuch as rowing constitutes good exercise for the upper torso of the body as well as the legs of a body, whereas bicycling offers exercise primariy for the legs of a cyclist, a need exists for a type of vehicle which may be propelled in generally the same manner in which a boat is rowed.

Examples of various forms of vehicles including drive systems having some of the general structural and operational features of the instant invention are disclosed in U.S. Pat. Nos. 224,415, 348,619, 369,860, 427,110, 500,826 and 642,544.

BRIEF DESCRIPTION OF THE INVENTION

The wheeled vehicle with oar-type propulsion is constructed in a manner whereby the rowing movement of conventional oars is substantially duplicated for propulsion of the vehicle.

The vehicle may be readily constructed in order that a single occupant thereof may propel the vehicle through the utilization of a pair of opposite side oar-like levers, or the vehicle may be constructed in a manner such that persons disposed thereon in tandem relation may each actuate an oar-type actuating lever on a corresponding side of the vehicle. Of course, the vehicle may also be constructed in a manner whereby tandem occupants of the vehicle may each actuate a pair of opposite side oar-type propelling levers.

The main object of this invention is to provide a vehicle to be powered by the occupant independent of a motor and with the occupant of the vehicle actuating a propelling lever in the manner of an oar.

Another object of this invention is to provide a wheeled vehicle incorporating a novel drive train whereby oscillatory movement of an oar-type actuating lever may be converted into rotary torque for driving a support wheel of the vehicle.

Yet another object of this invention is to provide a vehicle constructed in a manner whereby it may be readily steered.

Still another object of this invention is to provide a vehicle in accordance with the preceding objects and which will have an extremely low center of gravity.

The final object of this invention to be specifically enumerated herein is to provide a vehicle in accordance with the preceding objects and which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
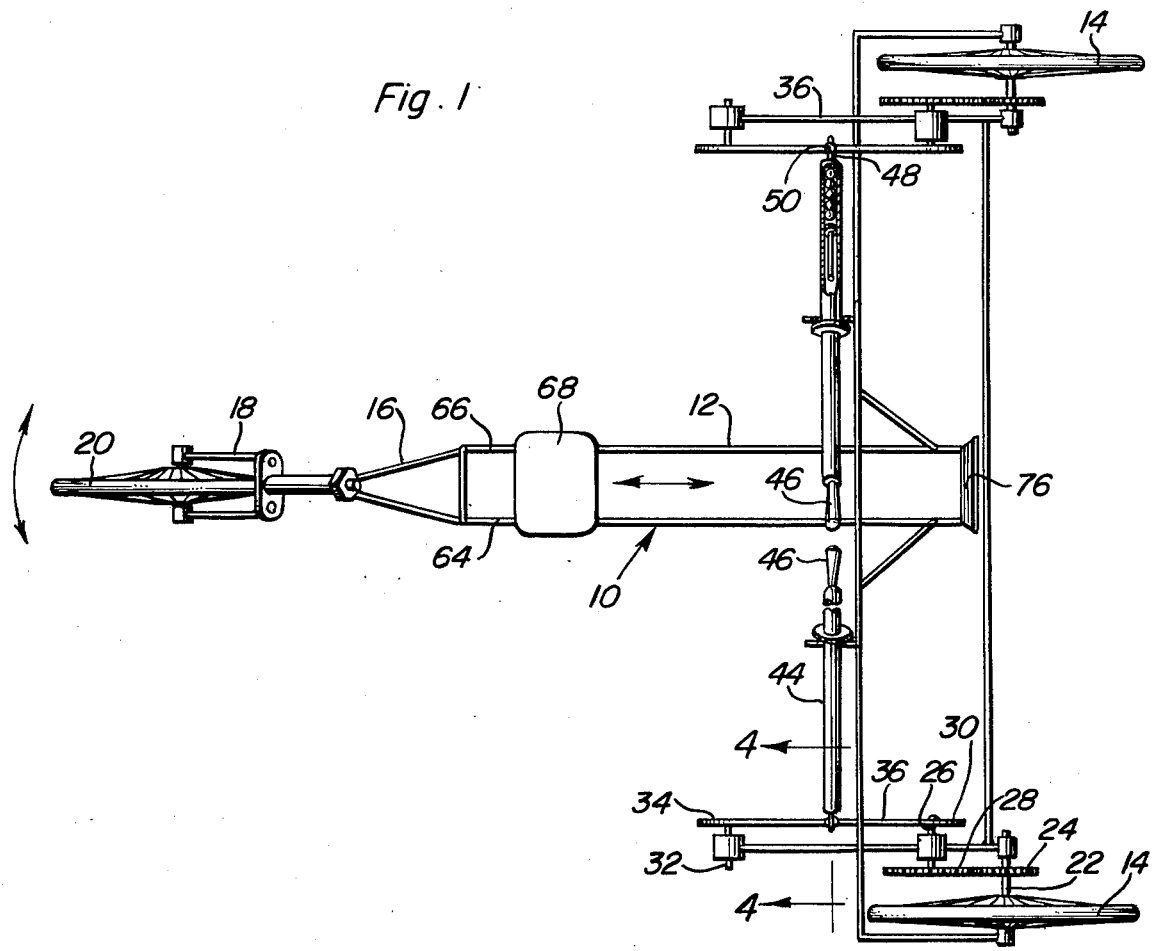
FIG. 1 is a top plan view of a first form of vehicle constructed in accordance with the present invention.
Figure 2:
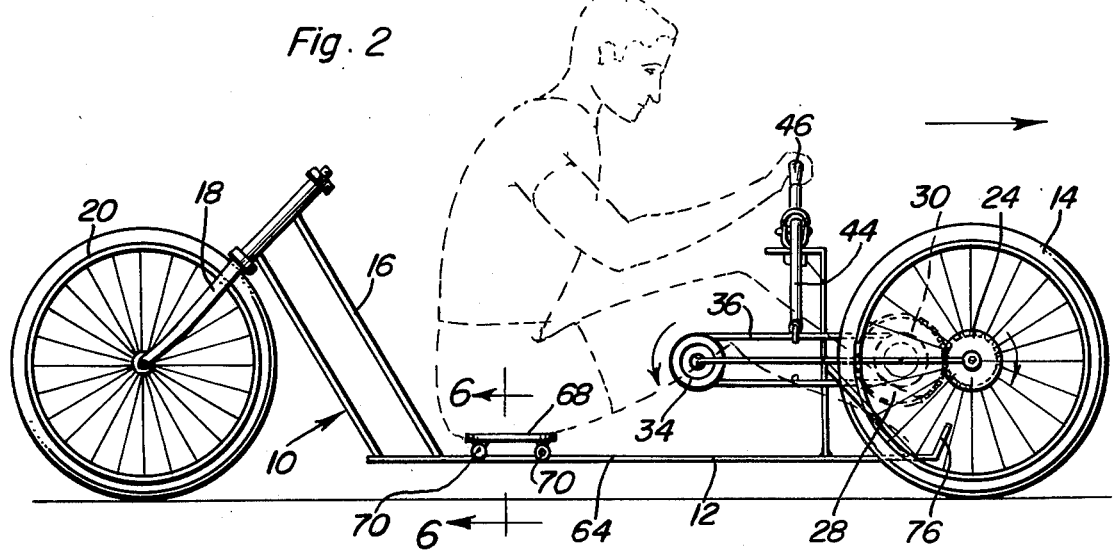
FIG. 2 is a side elevational view of the vehicle illustrated in FIG. 1.
Figure 3:
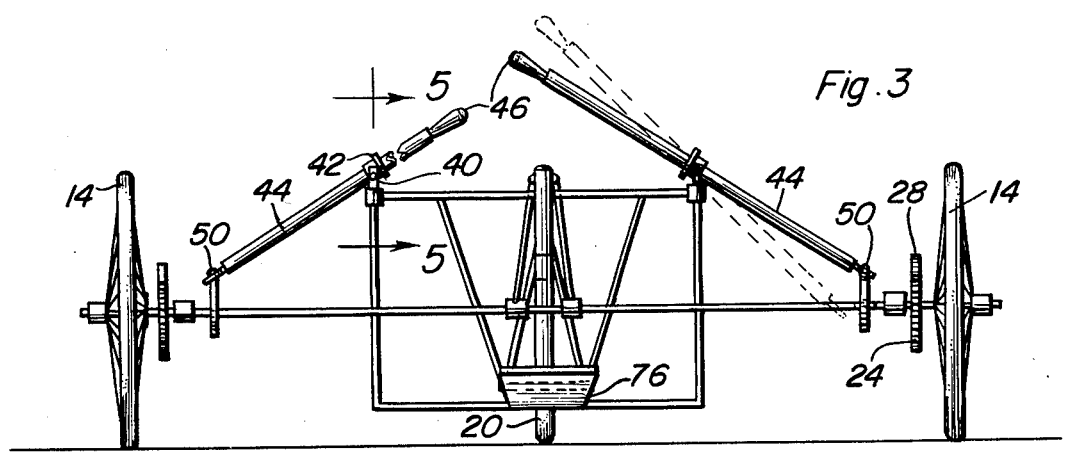
FIG. 3 is a front elevational view of the vehicle illustrated in FIG. 2.
Figure 4:
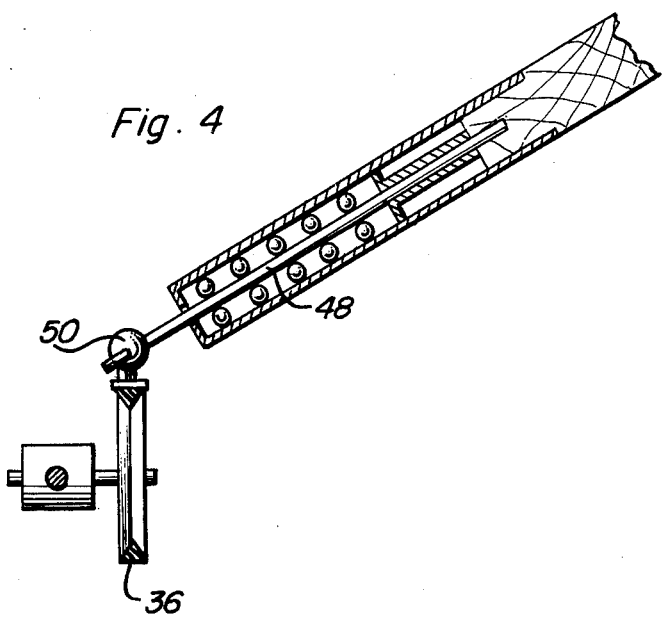
FIG. 4 is an enlarged fragmentary transverse vertical sectional view taken substantially upon the plane indicated by section line 4—4 of FIG. 1.
Figure 5:
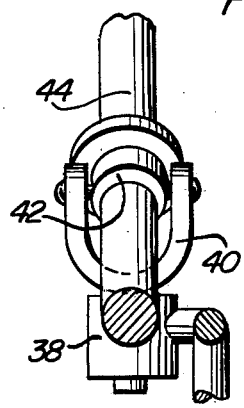
FIG. 5 is an enlarged fragmentary longitudinal vertical sectional view taken substantially upon the plane indicated by the section line 5—5 of FIG. 3.
Figure 6:
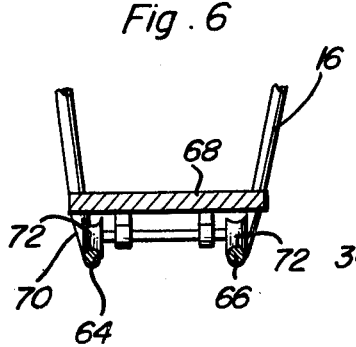
FIG. 6 is an enlarged fragmentary transverse vertical sectional view taken substantially upon the plane indicated by the section line 6—6 of FIG. 2.
Figure 7:
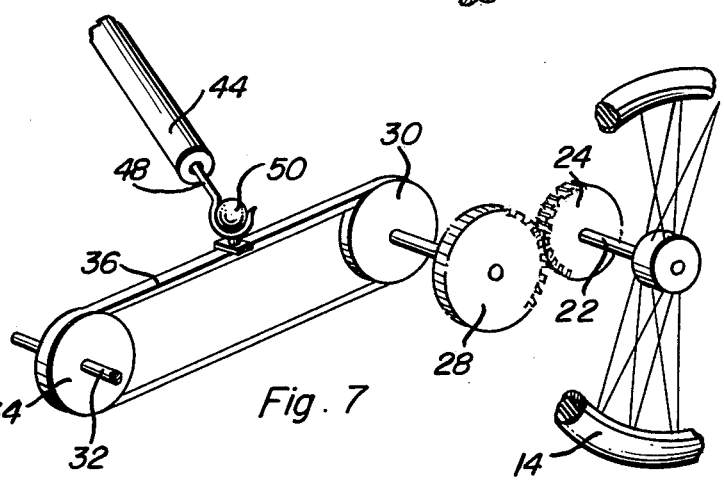
FIG. 7 is a fragmentary perspective view of one side portion of the drive mechanism for the vehicle.

Referring now more specifically to the drawings and to FIGS. 1 through 7 in particular, the numeral 10 generally designates the vehicle of the instant invention. The vehicle 10 includes a low longitudinally extending main frame 12 having a pair of opposite side front wheels 14 journalled from its forward end portion. The rear end portion of the main frame 12 includes an upwardly inclined and rearwardly directed section 16 from whose upper end a rear central fork assembly 18 is journalled, a rear wheel 20 being journalled from the fork assembly 18.

Any suitable steering structure (not shown) may be provided for manually steering the fork assembly 18, but the latter comprises a caster wheel assembly and the vehicle 10 may therefore be steered, at least to some degree by applying different rotational torque to the opposite side front wheels 14.

Each of the front wheels 14 is mounted on a shaft 22 journalled from the frame 12 and each shaft 22 has a gear wheel 24 mounted thereon. A first forward jack shaft 26 is journalled from each side of the main frame 12 and has a gear wheel 28 mounted thereon meshed with the corresponding gear wheel 24. The gear wheel 28 is carried by the outer end of the corresponding jack shaft 26 and the inner end of each jack shaft 26 supports a drive wheel 30 therefrom.

Each side of the frame 12 further includes a second jack shaft 32 journalled therefrom upon which a second drive wheel 34 is mounted and the drive wheels 30 and 34 disposed at opposite sides of the frame 12 are lined. An endless flexible drive member such as a belt 36 is trained about each pair of aligned wheels 34 and 30.

The frame 12 includes opposite side portions 38 from which support yokes 40 are mounted for oscillation about upstanding axes and each of the support yokes 40 oscillatably supports a mounting ring 42 for rotation about the horizontal axis. Each mounting ring 42 receives an elongated oar-type lever 44 therethrough. The levers 44 extend generally transversely of the vehicle 10 on opposite sides thereof and the adjacent inner ends of the levers 44 are provided with hand grips 46. Further, the outer end of each lever 44 includes an extension 48 telescopingly and rotatably engaged therewith and the outer end of each extension 48 is secured to an anchor element 50 carried by the corresponding belt 36 for orbital movement therewith about the wheels 30 and 34. Inasmuch as the extension or outer end portion 48 of each lever 44 is supported from the corresponding lever 44 for longitudinal shifting relative thereto and angular displacement relative thereto, the outer ends of the levers 44 orbit about the corresponding pulley wheels 30 and 34 whereby the handle or hand grip ends of the levers 44 move through paths simulating the paths of movement of the inner ends of oars being utilized to propel a boat.

The frame 12 includes a pair of opposite side longitudinal members 64 and 66 and a seat 68 is provided with front and rear wheeled axles 70 including opposite end flanged wheels 72 rollingly engaged with the longitudinal members 64 and 66. Accordingly, the seat 68 may be rolled back and forth longitudinally of the longitudinal members 64 and 66.

Figure 8:
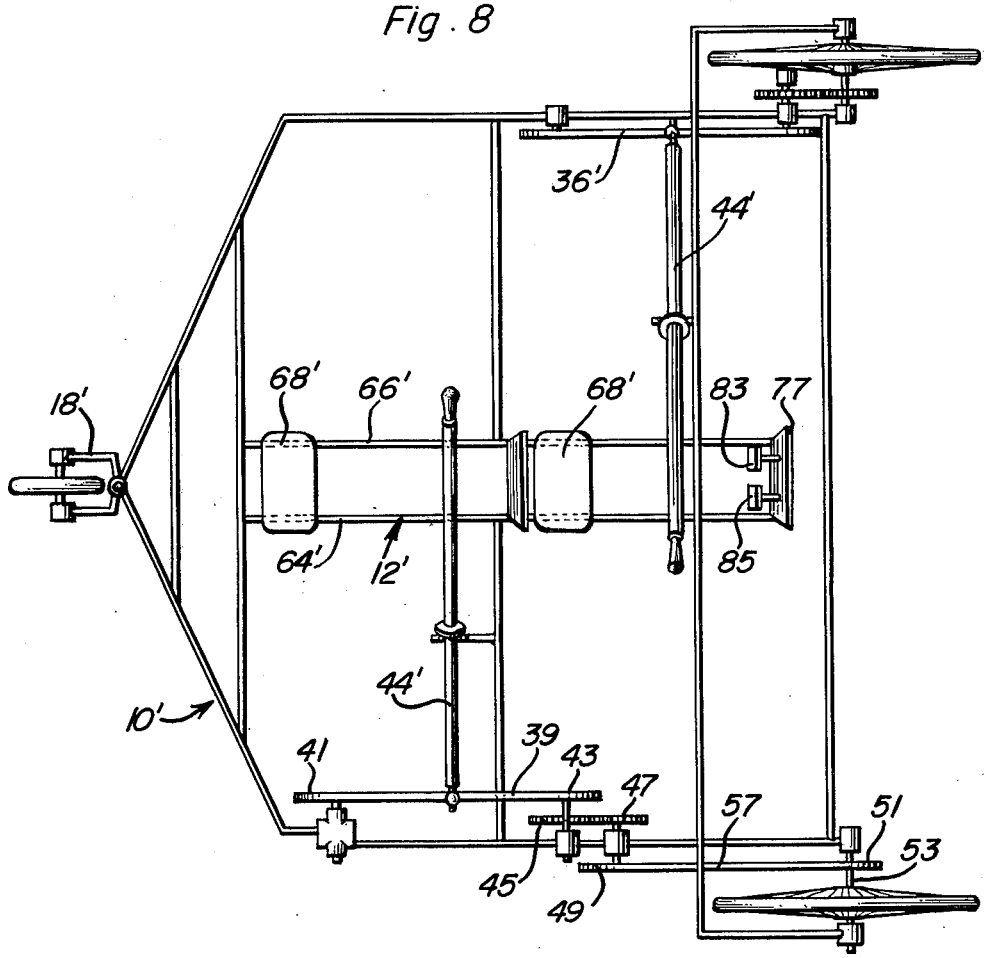
FIG. 8 is a top plan view of a modified form of vehicle constructed in accordance with the present invention and utilizing a tandem seating arrangement for pair of occupants to drive opposite side support wheels of the vehicle.
Figure 9:
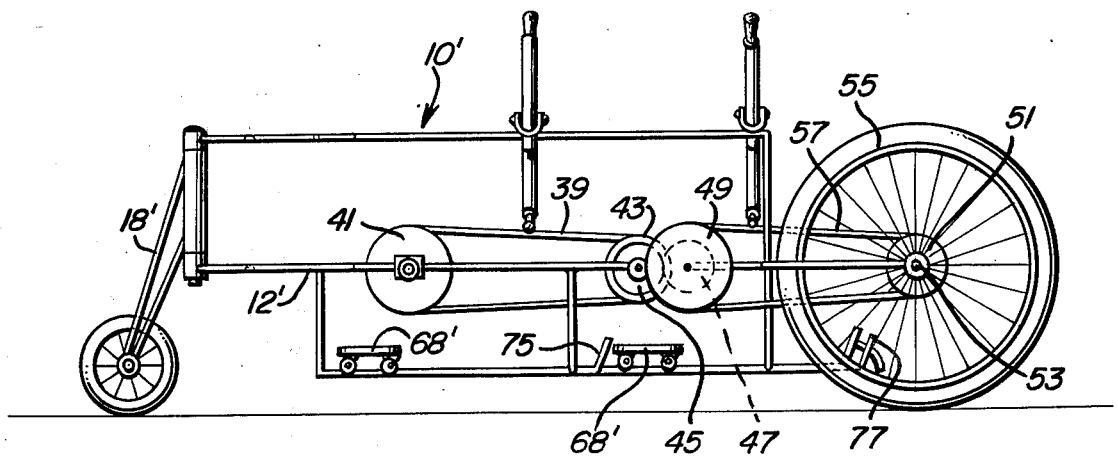
FIG. 9 is a side elevational view of the vehicle illustrated in FIG. 8.

With attention now invited more specifically to FIGS. 8 and 9 of the drawings, a second form of vehicle is referred to in general by the reference numeral 10'. The vehicle 10' is similar in many respects to the vehicle 10, except that the frame 12' thereof has a pair of tandem seats 68' mounted thereon for rolling movement therealong. Also, the vehicle 10' includes a forward lever 44' disposed on the left side of the vehicle 10' and a rear lever 44' disposed on the right side of the vehicle 10'. The left forward lever 44' is anchored relative to an endless drive member 36' at the left side of the vehicle 10' and the lever 44' at the rear right portion of the frame 12' is anchored relative to an endless drive member 39 disposed at the rear right-hand portion of the frame 12'. The endless drive member 36' corresponds to the endless drive member 36 disposed at the left side of the frame 12, but the endless drive member 39 is trained about a pair of drive wheels 41 and 43 journalled from the right side of the frame 12' with the drive wheel 43 including a gear wheel 45 meshed with a gear wheel 47 carried by a third drive wheel 49 journalled from the right side of the frame 12'. Still further, a fourth drive wheel 51 is mounted on the shaft 53 upon which the right forward wheel 55 of the vehicle 10' is mounted and an endless drive member 57 drivingly connects the wheel 49 to the wheel 51.

The frame 12' includes a pair of longitudinal members 64' and 66' corresponding to the frame members 64 and 66 and the seats 68' are rollingly supported from the longitudinal members 64' and 66'. The frame 12' includes a stationery footrest 75 engageable by the feet of a person disposed on the rear seat 68' and a footrest 77 engageable by a person seated on the forward seat 68'. Further, the vehicle 10 includes a forward footrest 76 which may be engaged by a person disposed on the seat 68.

Both of the vehicles 10 and 10' may be readily steered by applying different amounts of rotary torque to the opposite side front wheels thereof. Further, the vehicles 10 and 10' may be converted for use on snow-covered surfaces by equipping the front wheels thereof with suitable traction lugs and the rear wheels thereof may be substituted for by skis. Also, the endless members 36, 36', 39 and 57 may comprise V-belts, chains or toothed belts.

From FIG. 8 of the drawings it may be seen that the forward footrest 77 may be equipped with rocking pedals 83 and 85 and the rocking pedals 83 and 85 may be operatively connected to the rear fork assembly 18' corresponding to the fork assembly 18 for steering the rear fork assembly 18' in response to alternate rocking movements applied to the pedals 83 and 85.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. A wheeled vehicle with oar-type drive assembly, said vehicle including a main frame, a plurality of support wheels journalled from said frame, first drive wheel means drivingly connected to one of said support wheels and journalled from said frame for rotation about a first axis, a second drive wheel means journalled from said frame for rotation about a second axis spaced from and generally paralleling said first axis, an endless drive member trained over said drive wheel means, an elongated lever, means universally anchoring one end of said lever to said drive member for orbiting therewith about said drive wheels, and means universally anchoring a mid portion of said lever relative to said frame, the other end of said lever including hand grip means.

2. The combination of claim 1 wherein said drive wheel means are journalled from said frame for rotation about generally horizontal axes.

3. The combination of claim 1 wherein said vehicle includes a pair of opposite side support wheels, said first drive wheel means including a pair of first drive wheels drivingly connected to said opposite side support wheels, said second drive wheel means including a pair of second drive wheels associated with said pair of first drive wheels, a pair of endless drive members trained over each pair of first and second drive wheels, and a pair of opposite side levers having one pair of ends anchored to corresponding endless drive members and mid portions of said levers universally anchored relative to said frame, the other pair of ends of said levers being disposed adjacent the longitudinal centerline of said vehicle and manually engageable in the hands of a person seated along said centerline.

4. The combination of claim 3 including, a seat mounted on said frame for guided movement back and forth along the longitudinal centerline thereof and adapted to seat a person whose hands are engaged with said other pair of ends of said levers, said frame including a footrest engageable by the feet of a person seated on said seat for controlled positioning of said seat along said centerline by the feet of said person during "rowing" operations to propel said vehicle.

5. The combination of claim 3 including a pair of third and fourth drive wheels journalled from one side of said frame and disposed in tandem relation relative to the corresponding of pair first and second drive wheels, a third endless drive member trained about the said third and fourth wheels, one of said levers being anchored to said third drive member.

6. The combination of claim 5 wherein one of said support wheels is dirigible, whereby said vehicle may be steered.

7. The combination of claim 5 wherein said levers each include relatively telescoped and rotatable first and second end portions comprising said mid portions being defined by said second end portions.

8. The combination of claim 1 wherein said lever includes relatively telescopingly engaged first and second end portions comprising said one and other ends thereof, said mid portion of said lever being defined by said second end portions thereof.

9. The combination of claim 8 wherein said vehicle includes a pair of opposite side support wheels, said first drive wheel means including a pair of first drive wheels drivingly connected to said opposite side support wheels, said second drive wheel means including a pair of second drive wheels associated with said first drive wheels, a pair of endless drive members trained over each pair of first and second drive wheels, and a pair of opposite side levers having one pair of ends anchored to corresponding endless drive members and mid portions of said levers universally anchored relative to said frame, the other pair of ends of said levers being disposed adjacent the longitudinal centerline of said vehicle and manually engageable in the hands of a person seated along said centerline.

10. The combination of claim 1 wherein one of said support wheels is dirigible, whereby said vehicle may be steered.

* * * * *